June 24, 1969   J. VOSTORIS   3,451,486
SOD CUTTING DEVICE
Filed Aug. 3, 1967

INVENTOR
JOHN VOSTORIS
BY
Hauke, Kruss & Gifford
ATTORNEYS

United States Patent Office 3,451,486
Patented June 24, 1969

3,451,486
SOD CUTTING DEVICE
John Vostoris, 2132 Otter, Warren, Mich. 48092
Filed Aug. 3, 1967, Ser. No. 658,194
Int. Cl. A01b 45/04
U.S. Cl. 172—13                2 Claims

ABSTRACT OF THE DISCLOSURE

A sod cutting device having a blade moving into and out of a close fitting shroud which protects the cutting edge of the blade and removes soil from the blade as it returns from a cutting stroke.

BACKGROUND OF THE INVENTION

Field of the invention

This invention relates to sod cutting and lawn edging devices and more specifically to a sod cutting device having a movable blade with a cutting edge which extends from a close fitting shroud to penetrate the sod and then returns to a position within the shroud with soil adhering to the blade being removed by the edges of the blade receiving opening of the shroud.

Description of the prior art

A sod cutting and lawn edging device conventionally comprises a blade mounted on a frame which is positioned on the ground with means for moving the blade in a path such that the cutting edge of the blade penetrates the sod. Some devices of the prior art are manually operated and take the form of a reciprocally mounted cutting blade with a handle adapted for applying a manual force to thrust the blade into the ground and then to withdraw the blade from the ground in a return stroke as the device is advanced over the ground. Other forms of conventional lawn edging devices are provided with motor means coupled to a rotating blade. As the device traverses the ground, the rotating blade penetrates the sod to form a uniform lawn border.

A common problem associated with both manual and motorized sod cutting devices of the prior art is that when the blade penetrates the sod, soil often has a tendency to adhere to the blade and clog the operating elements of the device when the blade is returned to a retracted position. Another disadvantage associated with manually operated sod cutting devices is that when the device is positioned on the ground, conventional blade supporting frames are inherently unstable as the blade is thrust into the sod because of the lack of sufficient engagement of the frame with the ground.

The broad purpose of the present invention is to provide an improvement in sod cutting devices wherein the soil that adheres to the blade during a cutting stroke is automatically removed as the blade is withdrawn from the ground.

SUMMARY

A preferred embodiment of the present invention, which will be subsequently described in greater detail, takes the form of a manually operated sod cutter comprising a frame which is positioned on the ground and blade means mounted on the frame for reciprocal movement between raised and lowered positions.

The frame includes a flat ground engaging support plate having an upturned edge. A second plate is fixedly mounted in close proximity to the upturned edge of the ground engaging plate to form an upstanding shroud for the cutting blade. The lower edge of the shroud defines a downwardly directed blade receiving opening. A pair of uprights support a sleeve above the shroud. A rod-like handle, slidably mounted in the sleeve, has its lower end attached to the blade and its upper end adapted so that a downward driving manual force can be applied to the blade. An adjustable stop member is carried by the handle above the sleeve with a compressible return spring wrapped around the handle and acting between the stop and the sleeve.

When a downward force is applied to the handle, the lower cutting edge of the blade which is normally disposed within the shroud is driven downwardly into the sod in a cutting stroke. The depth the cutting blade penetrates into the sod is determined by the longitudinal position of the stop member at the handle. The downward movement of the blade is terminated when the spring between the stop member and the sleeve is fully compressed. When the downward force is released, the return spring raises the handle and the blade upwardly so that the cutting edge of the blade is withdrawn into the shroud.

The edges of the blade-receiving opening automatically remove any soil that has adhered to the blade during its return stroke. When the blade is in its fully retracted position, the cutting edge is protected within the shroud from impact from foreign objects that might otherwise dull the cutting edge.

The support plate provides means for the operator to stand on the device as he thrusts the blade into the ground so that the device is stabilized during the cutting stroke. By mounting the blade and handle such that they move together in a common vertical plane, there are no side forces acting on the blade thereby permitting the full force of the operator to be applied to the blade by means of a simple but rugged frame.

It is therefore an object of the present invention to improve sod cutting and lawn edging devices having a cutting blade which penetrates the sod and is removed therefrom by providing a shroud with a pair of edges mounted closely adjacent opposite sides of the cutting blade and which automatically removes soil that adheres to the blade as the blade is withdrawn from the sod.

Another object of the present invention is to provide a manually operated sod cutting device having a blade movable between raised and lowered positions in cutting and return strokes with means for adjusting the depth the blade penetrates the sod in a cutting stroke.

Still another object of the present invention is to provide a sod cutting device having a frame mounted on a ground engaging plate so that a weight on the support will stabilize the device as the cutting blade is thrust into the ground.

A still further object of the present invention is to improve sod cutting devices having movable blade means by providing a handle for the operator to apply a force in the plane of movement of the blade in its cutting stroke so that there are no lateral forces produced on the device thereby permitting a simple and stable frame to accommodate the blade.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
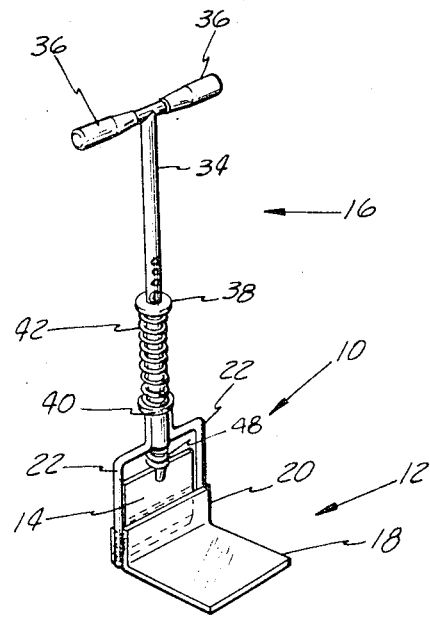
FIGURE 1 is a perspective view of a manually operated sod cutting device illustrating the preferred embodiment of the present invention with the cutting blade shown in its retracted position.
Figure 2:
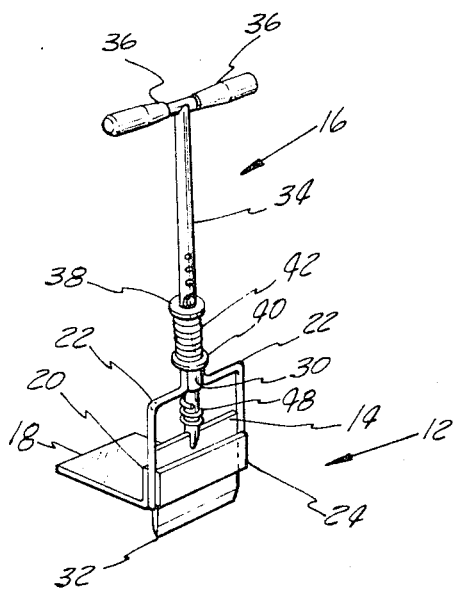
FIGURE 2 is a perspective view of the opposite side of the device of FIGURE 1 and showing the cutting blade in its extended position.
Figure 3:
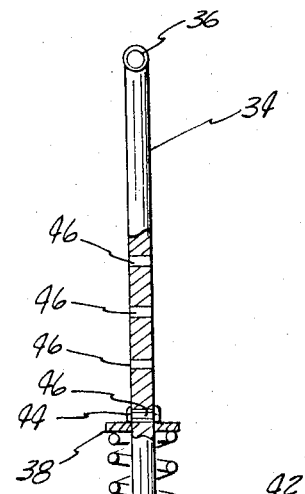
FIGURE 3 is an enlarged, sectional view through the shroud of the device of FIGURE 1 and showing the blade and handle in a partially extended position.

Referring to the drawings, FIGURES 1–3 illustrate a preferred manually operated sod cutting device 10. The sod cutting device 10 comprises frame means generally indicated at 12, a blade 14 movably mounted on frame 12 and handle means 16 for operating the blade 14.

The frame 12 comprises a flat plate section 18 which is intended to be positioned on the ground so that the operator can stand on the support plate 18 to stabilize the device 10 when the blade 14 is thrust into the ground. The plate 18 has an upturned edge 20 formed along one side. A pair of angularly bent rod members 22 are fixedly mounted as by welding to the opposite lateral sides of the upturned section 20. A rectangular plate 24 is fixed to the lower ends of the rods 22 and spaced in parallel relationship and close proximity to the upturned plate section 20 to form a shroud for the blade 14. The shroud has a lower blade receiving opening 26 adjacent the bend 28 connecting the upturned edge 20 of the plate 18. The edge 20 and the plate 24 are spaced a distance slightly greater than the thickness of the blade 14 as can best be seen in FIGURE 3.

A sleeve 30 is fixedly attached to the upper ends of the support rods 22 and above the blade receiving opening 26.

The blade 14 comprises a generally rectangular, flat, metal section having a lower cutting edge 32 which may be parallel to the plate 24 or slightly shaped. The blade 14 is movable between raised and lowered positions with the cutting edge 32 moving a predetermined distance below the lower surface of the support blade 18 when the handle means 16 is driven downwardly. When the blade 14 is retracted, the blade is withdrawn between the plate sections 20 and 24 so that cutting edge 32 is above the blade receiving opening 26. As the blade 14 is withdrawn within the shroud formed by the plate sections 20 and 24, any soil that has adhered to the blade 14 during the downward cutting stroke is automatically removed from both sides of the blade 14. This self cleaning feature insures that the blade always has a clean cutting surface as it is thrust into the ground. In addition, when the blade 14 is in its fully retracted position, the cutting edge 32 is shielded against impact with objects that might otherwise dull the cutting edge.

The handle means 16 includes a rod-like upright handle 34 slidably mounted in the sleeve 30 and having its lower end attached to the upper edge of the blade 14. A pair of lateral handle members 36 carried at the upper end of the handle 34 provide means for the operator to apply a downward driving force on the handle 34.

An upper washer member 38 mounted on the handle 34 and a lower washer member 40 which is mounted adjacent the upper end of the sleeve 30 provide means for retaining a return spring 42. The position of the upper washer 38 on the handle 34 is determined by a bolt member 44 which is received by a selected one of a number of longitudinally spaced adjusting apertures 46 formed in the handle 34.

The spring 42 is compressed when a downward driving force is applied on the handle 34. When the downward driving force is released from the handle 34, the spring 42 returns the handle 34 and the blade 14 upwardly. As can best be seen in FIGURE 2, the depth at which the blade 14 penetrates the soil is determined by the position at which the spring 42 becomes fully compressed so that it limits downward movement of the handle 34. Thus by locking the bolt 40 in a selected adjusting aperture 46, the depth of penetration of the blade 14 can be varied.

A rebound spring 48 mounted on the handle 34 between the upper edge of the blade 14 and the lower end of the sleeve 30 acts as a shock absorber when the blade 14 is returned to its fully retracted position by the spring 42.

Having thus described my invention, I claim:

1. A sod cutting device, comprising
 (a) a support frame having a support plate extending therefrom for engagement with the ground, and adapted for the application of foot pressure to hold said plate in contact with the surface of the ground when the frame is in a sod cutting position;
 (b) a blade having a cutting edge supported on the frame for motion between a pair of spaced positions when the frame is in its sod cutting position, said pair of positions including a raised position in which the cutting edge of the blade is above a plane containing the ground engaging surface of the support plate, and a lowered position in which the cutting edge of the blade is below said plane;
 (c) a shroud mounted on said frame for enclosing the cutting edge of the blade when it is in its raised position, said shroud having a blade-receiving opening with edge portions supported in close proximity to the path of the cutting edge of the blade as it is moved in a return stroke to its raised position so that edge portion to remove soil carried by the blade in its return stroke;
 (d) a sleeve mounted on said support frame above said shroud;
 (e) an elongated handle slidably engaged with said sleeve, said handle having a lower end attached to said blade and an upper end adapted for the application of a downward force to move the blade from its raised position toward its lowered position;
 (f) a stop member carried by said handle above said sleeve;
 (g) a spring member mounted between said stop member and said sleeve so as to be compressed by the downward movement of the handle, and operable to return the handle upwardly upon release of the force producing said downward movement; and
 (h) means for mounting said stop member in a selected longitudinal position on the handle to vary the travel of the handle and the blade between their raised and their lowered positions.

2. The sod cutting device as defined in claim 1, including a rebound spring mounted on the handle between the sleeve and the blade.

References Cited

UNITED STATES PATENTS

| 409,818 | 8/1889 | Bell | 172—604 X |
| 1,532,082 | 3/1925 | Schaefer | 172—14 X |
| 2,513,730 | 7/1950 | Little | 172—18 X |
| 3,086,596 | 4/1963 | Allegretti et al. | 172—15 |
| 3,144,084 | 8/1964 | Smith | 172—15 |
| 2,581,477 | 1/1952 | Franks | 172—15 |

FOREIGN PATENTS 228,526  6/1960  Australia.

ABRAHAM G. STONE, Primary Examiner.

J. W. PETERSON, Assistant Examiner.